United States Patent
Looi et al.

(10) Patent No.: US 9,244,334 B2
(45) Date of Patent: Jan. 26, 2016

(54) CONTACT HAVING AN ANGLED PORTION

(71) Applicant: STMicroelectronics Pte Ltd., Singapore (SG)

(72) Inventors: Hk Looi, Singapore (SG); Wee Chin Judy Lim, Singapore (SG); Cheng-Hai Cheh, Singapore (SG); Bs Aw, Singapore (SG); David Gani, Singapore (SG); Tin-Tun Maung, Singapore (SG); Choon Lee Lai, Singapore (SG)

(73) Assignee: STMicroelectronics Pte Ltd, Singapore (SG)

( * ) Notice: Subject to any disclaimer, the term of this patent is extended or adjusted under 35 U.S.C. 154(b) by 257 days.

(21) Appl. No.: 13/853,598

(22) Filed: Mar. 29, 2013

(65) Prior Publication Data

US 2014/0293120 A1 Oct. 2, 2014

(51) Int. Cl.
*H04N 5/225* (2006.01)
*G03B 3/10* (2006.01)
*G02B 7/09* (2006.01)

(52) U.S. Cl.
CPC .. *G03B 3/10* (2013.01); *G02B 7/09* (2013.01); *Y10T 29/4913* (2015.01)

(58) Field of Classification Search
CPC . H04N 5/2252; H04N 5/2253; H04N 5/2254; G03B 2217/002; G03B 3/10; G02B 7/09

USPC ................................. 348/340, 360, 373–374
See application file for complete search history.

(56) References Cited

U.S. PATENT DOCUMENTS

| | | | |
|---|---|---|---|
| 2011/0063496 A1* | 3/2011 | Chang | 348/360 |
| 2013/0120648 A1* | 5/2013 | Oh | 348/374 |
| 2014/0043524 A1* | 2/2014 | Azuma et al. | 348/357 |

* cited by examiner

*Primary Examiner* — Kelly L Jerabek
(74) *Attorney, Agent, or Firm* — Gardere Wynne Sewell LLP

(57) ABSTRACT

Described herein are various embodiments of contacts that include different portions angled with respect to one another and methods of manufacturing devices that include such contacts. In some embodiments, a module may include a first portion of a contact that is disposed within a housing and a second portion that is disposed outside of the housing, with the second portion angled with respect to the first portion. Manufacturing such devices may include depositing a conductive material to electrically connect the contact to a contact pad of a substrate. In some embodiments, a deposition process for depositing the conductive material may have a minimum dimension, which defines a minimum dimension of a conductive material once deposited. In some such embodiments, a distance between a terminal end of the contact pin and the contact pad may be greater than the minimum dimension of the deposition process.

44 Claims, 9 Drawing Sheets

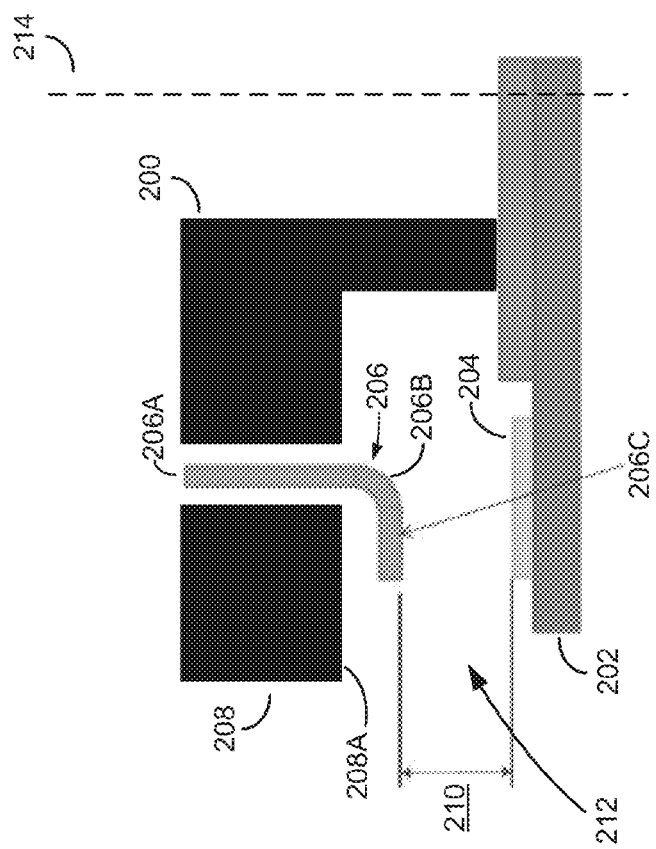

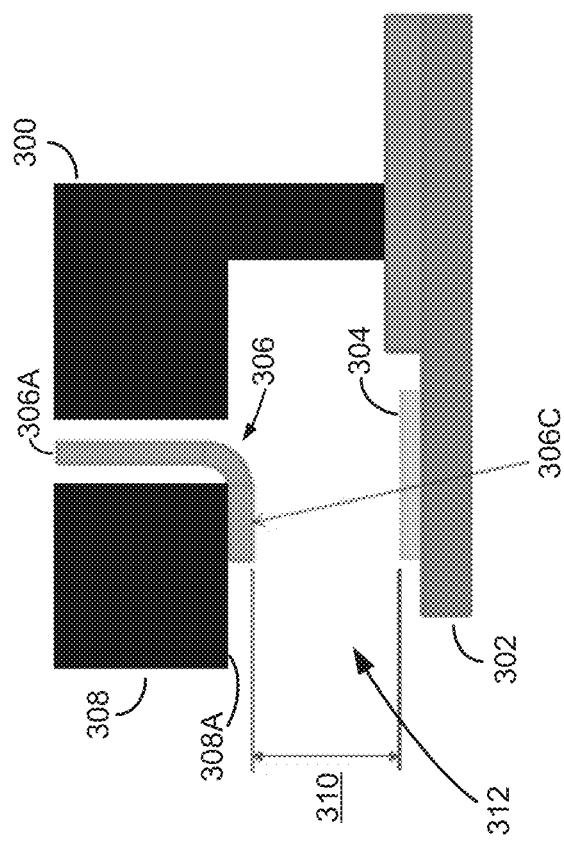

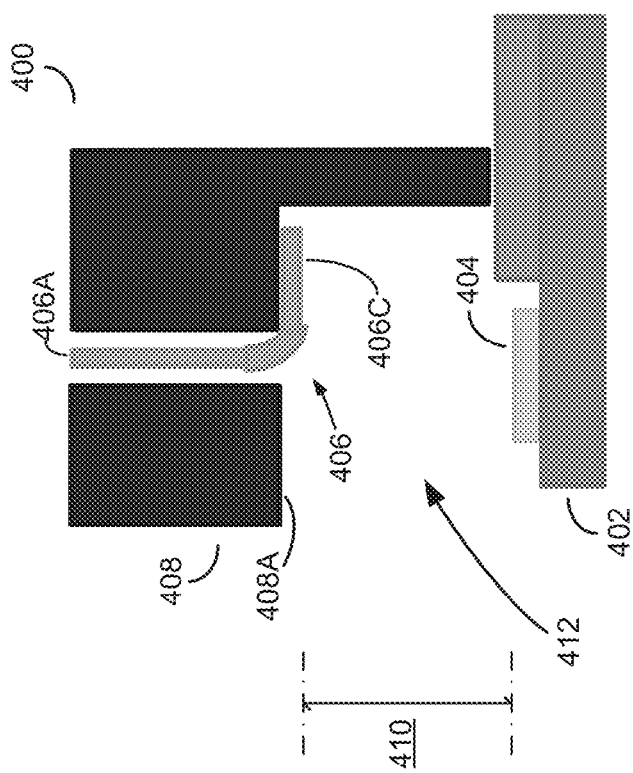

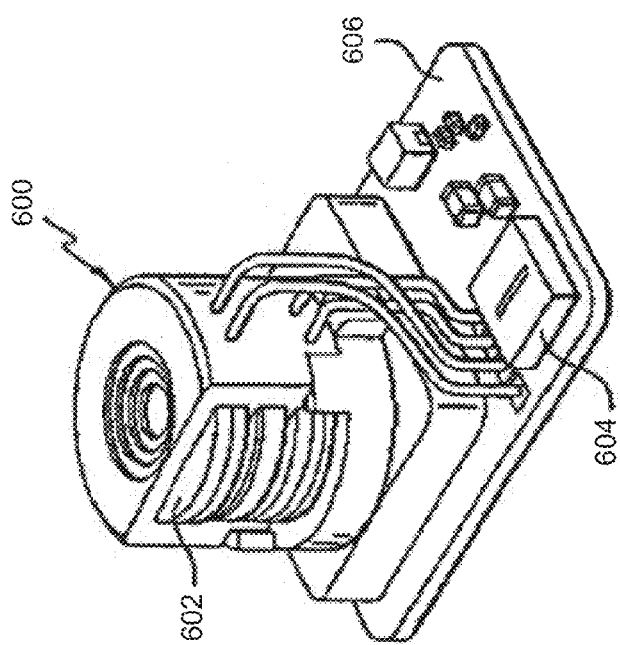

CONTACT HAVING AN ANGLED PORTION

BACKGROUND

To electrically connect a circuit to a circuit board, the circuit may include pins that can be connected to pads on the circuit board. The pins protrude from a packaging of the circuit. To connect the pin to the pad, a piece of solder or conductive glue can be deposited that contacts the pin and the pad, and that thereby provides a conductive path between the pin and the pad.

FIG. 1 illustrates a circuit 100 that is connected to a circuit board 102. The circuit board 102 includes a pad 104 and the circuit 100 includes a pin 106. As illustrated in FIG. 1, the pin 106 is a straight metal piece that protrudes from the circuit 100 into an empty space, extending toward the substrate 102. To provide an electrical path between the pad 104 and pin 106, a piece of solder 110 is deposited that contacts both the pad 104 and pin 106. The piece of solder 110 is deposited on one side of the pin 106 and contacts that side of the pin 106.

SUMMARY

In one embodiment, there is provided an apparatus comprising a camera module, where the camera module comprises a housing, an image sensor disposed within the housing, at least one lens disposed within the housing, and an actuator to move the at least one lens in accordance with a signal received via a control input of the actuator. The actuator is disposed within the housing. The camera module further comprises a contact comprising a first portion disposed within the housing and a second portion disposed outside of the housing. The second portion is angled with respect to the first portion, and is angled away from a center axis of the camera module. The contact is electrically connected to the control input. The apparatus further comprises a substrate comprising a contact pad, a control circuit to perform a focus operation to produce the signal and to output the signal via an output, the output being electrically connected to the contact pad. The apparatus further comprises a conductive material electrically connecting the contact to the contact pad. In the apparatus, the contact does not contact the contact pad.

In another embodiment, there is provided an apparatus comprising a housing, an actuator to move at least one lens, where the actuator is disposed within the housing, and a contact pin comprising a first portion disposed within the housing and a second portion disposed outside of the housing. The second portion is angled with respect to the first portion.

In a further embodiment, there is provided a method comprising affixing a module to a substrate. The module comprises a contact to receive focus control signals for controlling an actuator. The contact comprises a first portion disposed within the module and a second portion protruding from the module. The second portion is angled with respect to the first portion. The substrate comprises a contact pad. In the method, affixing the module to the substrate comprises depositing a conductive material to electrically connect the contact to the contact pad.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 2 is an illustration of an example of a contact that may be used in some embodiments;

FIG. 3 is an illustration of another example of a contact that may be used in some embodiments;

FIG. 4 is an illustration of another example of a contact that may be used in some embodiments;

FIG. 6 is an illustration of a camera module with which some embodiments may operate;

DETAILED DESCRIPTION

Applicant has recognized and appreciated that contact pins that protrude straight from a circuit packaging toward a circuit board are disadvantageous in a variety of environments. Mobile devices, such as mobile phones (including smart phones and other phones), e-readers, tablet computers, and laptop computers, are an example of such an environment. Because mobile devices are often roughly handled or dropped by users, mobile devices and components of mobile devices are often built to withstand a relatively large mechanical force, such as the force that may result from dropping the mobile device on the floor or ground.

Figure 1:
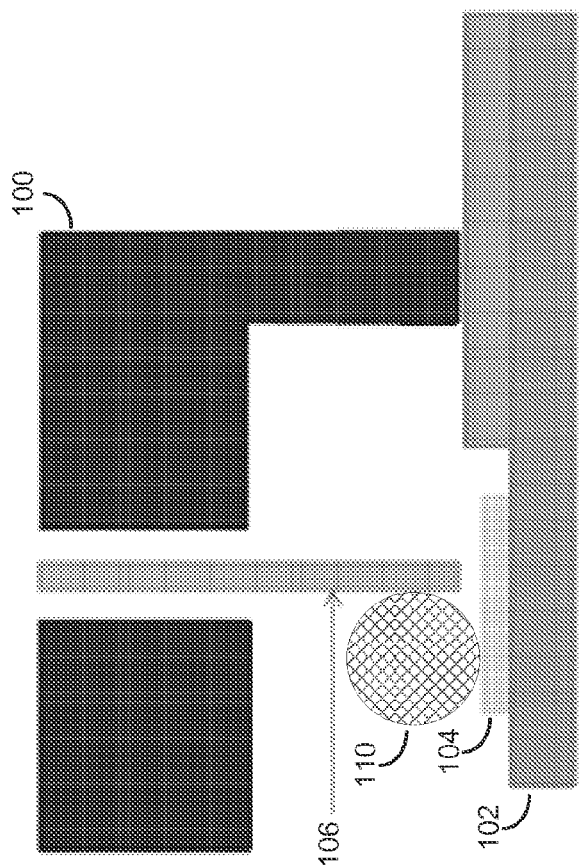
FIG. 1 is an illustration of an arrangement of a conventional contact pin in a module.

The type of contact pin illustrated in FIG. 1 is conventionally implemented in components that are to be used in mobile devices. Applicant has recognized and appreciated, however, that the type of contact pin illustrated in FIG. 1 cannot reliably withstand the mechanical force that may result from a mobile device being roughly handled or dropped by a user. As illustrated in FIG. 1, a manufacturer that is to affix the circuit 100 to the substrate 102 may be limited to depositing solder 110 on only one side of the pin 106. Applicant has recognized and appreciated that when the solder 110 is deposited on only one side of the pin 106, the pin 106 can pull away from the solder 110 when the circuit 100 (or a device that includes the circuit 100) is roughly handled or dropped. The pin 106 may be likely to pull away from the solder 110 when the pin 106 protrudes into a cavity and there is empty space on the side of the pin 106 opposite the solder 110, as in the example of FIG. 1. When the pin 106 pulls away from the solder 110, the pin 106 (and thereby at least part of the circuit 100) may be disconnected from the substrate 102, which may prevent proper operation of the circuit 100 and/or other components connected to the substrate 102.

Applicant has recognized and appreciated that a reliability of contacts and an ability of a circuit to withstand rough handling, impacts, or drops may be increased with contacts that are not straight. More particularly, Applicant has recognized and appreciated that by including in a contact an angled portion, the reliability of the contact may be increased. As one particular example, a first portion of a contact pin may protrude into a cavity, straight toward a contact pad of a substrate to which the contact pin is to be electrically connected, and a second portion of the contact pin that is contiguous with the first portion may be angled with respect to the first portion. The second portion may be at a right angle to the first portion. Applicant has recognized and appreciated that including such an angled portion in the contact pin may have various advantages, including with respect to deposition of a conductive material such as a conductive glue or solder. When a conductive material is deposited to electrically connect a contact pin to a contact pad and the contact pin includes an angled portion, the conductive material may be able to contact more than one side of at least part of the contact pin. For example, in some cases, the conductive material may be able to surround at least a part of the contact pin. Applicant has recognized and appreciated that, by contacting more than one side of the contact pin or surrounding the contact pin, the conductive material may have an increased ability to hold the contact pin in place and prevent the contact pin from disrupting operations of the circuit or other components by disconnecting from the conductive material. A contact pin with an angled portion may therefore have an increased reliability as compared to other types of pins, such as the straight pin illustrated in FIG. 1.

Accordingly, described herein are various embodiments of contacts that include different portions angled with respect to one another and methods of manufacturing devices that include such contacts. In some embodiments, a module may include a first portion of a contact that is disposed within a housing and a second portion that is disposed outside of the housing, with the second portion angled with respect to the first portion. Manufacturing such devices may include depositing a conductive material to electrically connect the contact to a contact pad of a substrate. In some embodiments, a deposition process for depositing the conductive material may have a minimum dimension, which defines a minimum dimension of a unit of conductive material that can be deposited using the process. In some such embodiments, a distance between a terminal end of the contact pin and the contact pad may be greater than the minimum dimension of the deposition process.

Examples of various embodiments are described below. It should be appreciated, however, that embodiments are not limited to being implemented in accordance with any of the examples described below.

Some embodiments may include a contact for a circuit, while other embodiments may include a contact for a module. A module may be an object that includes a circuit and/or other component(s) disposed within a housing. A housing may be a packaging that fully or partially encloses the circuit or other components and may include any suitable one or more materials, including one or more metals and/or one or more plastics. In embodiments in which a contact is a contact for a module, a portion of the contact may be disposed within the housing for the module and a portion of the contact may be disposed outside of the housing for the module. In addition, in some such embodiments, the contact may be electrically connected to one or more components (including one or more circuits) disposed within the housing.

In some embodiments, including in some examples described below, a contact may be a contact for a camera module. Such a camera module may be included in a mobile device, such as a mobile phone (including a smart phone or another type of mobile phone), an e-reader, a tablet computer, a laptop computer, or another mobile computing device arranged to be held by a user while in use and/or moved from place-to-place while in use. A camera module may include one or more elements related to a camera, including an image sensor, one or more lenses, and/or one or more actuators for moving the lens(es). In some embodiments, as discussed in detail below, such a camera module may include a contact having an angled portion in accordance with techniques described herein for receiving signals for controlling an actuator to move one or more lenses to focus an image that is received by the image sensor. Such signals may be received from a control circuit that is performing a focus operation. Such a focus operation may be a manual, user-controlled focus operation or an autofocus operation that is not controlled by user input, or any other suitable focus operation that may be performed by a control circuit. It should be appreciated, however, that embodiments that include a camera module with a contact having an angled portion are not limited to sending and/or receiving focus control signals via the contact and that other signals may be communicated via such a contact. For example, image sensor signals regarding an image that is detected by the image sensor may be communicated via a contact with an angled portion, or any other suitable type of signals carrying any other suitable type of information. It should also be appreciated that embodiments are not limited to operating with camera modules, and that other types of modules and other types of signals that may be communicated via contacts are possible.

FIG. 2 illustrates a first example of a module that includes a contact with an angled portion. FIG. 2 illustrates a portion of a module 200 in the vicinity of a contact 206. The module 200 is arranged to be affixed to a substrate 202. Substrate 202 may be any suitable substrate, including a circuit board, as embodiments are not limited in this respect. As discussed in detail below, the module 200 includes a contact 206, and the contact 206 includes a portion 206C that is angled with respect to another portion 206A.

Substrate 202 includes a contact pad 204 to which the contact 206 is to be electrically connected. The contact pad 204 may be electrically connected, such as via one or more conductive wires, leads, and/or vias of the substrate 202, to some other component (not illustrated in FIG. 2) connected to the substrate 202. The contact 206 may be electrically connected to some other component (not illustrated in FIG. 2) of the module 200, which may be an electrical component, mechanical component, electro-mechanical component, or any other suitable type of component. The pad 204 and contact 206 may be electrically connected such that these other components may be electrically connected to one another and such that one or both of the components is able to communicate a signal to another.

The module 200 includes a housing 208 that encloses one or more components of the module 200, which may be one or more electrical components of a circuit. FIG. 2 illustrates a portion of the housing 208, which may extend beyond what is illustrated and have any suitable size or shape for enclosing the components. The contact 206 is partially disposed within the housing 208 and partially disposed outside of the housing 208. The contact 206 may extend within the housing 208 beyond what is illustrated, to connect to a component of the module 200. As illustrated in FIG. 2, a first portion 206A of the contact 206 is disposed at least partially within the housing 208. The first portion 206A is disposed such that at least part of the first portion 206A is located within an exterior surface of the housing 208. Portions 206B, 206C of the contact 206 are disposed outside of the housing 208. In particular, as illustrated in FIG. 2, the contact 206 protrudes from a surface 208A of the housing 208. In the example of FIG. 2, the contact 206 protrudes from the surface 208A and is disposed within a cavity of the concave portion 212 of the housing 208.

The concave portion 212 is formed as an indent in the housing 208. The concave portion may be shaped in any suitable manner, including as a rectangular prism that is closed on four of the six sides of the rectangular prism. FIG. 2 is a cross section of the module 208 and, as a result, some of the sides of the rectangular prism of the concave portion 212 are not visible in FIG. 2. Though, those skilled in the art will understand how the housing 208 may be arranged to form the concave portion 212 as a rectangular prism or as any other shape.

The contact 206 protrudes from the housing 208 into the cavity and is, as illustrated in FIG. 2, the portions 206B, 206C may be surrounded by empty space of the cavity of the concave portion 212 until a conductive material is deposited and contacts the contact 206. In protruding from the housing 208, the portions 206B, 206C of the contact 206 may extend from the housing 208 into the cavity and not contact the housing 208. The portion 206B of the contact 206 may include a portion that protrudes from the surface 208A of the housing 208 and that is parallel to the portion 206A that is disposed inside the housing 208, such that a contiguous portion of the contact 206 extends within and outside of the housing 208 along an axis, without angling. A part of the portion 206B may also include a curve. The contact 206 also includes a portion 206C that is angled with respect to the portion 206A.

The portion 206C is illustrated in FIG. 2 at a 90-degree angle to the portion 206A and parallel to the contact pad 204 and to the surface 208A from which the contact 206 protrudes. It should be appreciated, however, that embodiments are not limited to any particular angle between the portion 206A and the portion 206C, any particular angle between the portion 206C and the contact pad 204, or any particular angle between the portion 206C and the surface 208A. The angle between the portions 206A, 206C may be any angle between 0 degrees and 180 degrees. In some embodiments, the angle between the portions 206A, 206C may be greater than 45 degrees, or greater than 75 degrees, greater than 85 degrees, or greater than 88 degrees. The angle between the portions 206A, 206C may also, in some embodiments, be less than 92 degrees, less than 95 degrees, less than 105 degrees, or less than 135 degrees. The angle between the portion of 206C and the surface 208A may be any angle between 0 degrees and 90 degrees, including an angle less than 45 degrees, less than 15 degrees, or less than 5 degrees. The angle between the portion 206c and the contact pad 204 may be any angle between 0 degrees and 90 degrees, including an angle less than 45 degrees, less than 15 degrees, or less than 5 degrees.

The angle between the portion 206A and the portion 206C may be determined by comparing axes of the portions 206A, 206C. In some embodiments, the portions 206A, 206C may each include a part that is straight for at least a part of the length of the portion, as illustrated in FIG. 2. In such embodiments, axes that run longitudinally through the straight parts of the portions 206A, 206C may be compared, and an angle between the axes considered, to determine the angle between the portions. The angle may also be determined, in some embodiments, based on first and second ends of each of the portions 206A, 206C. In these embodiments, axes may be drawn between a first end and a second end of each portion 206A, 206C and these axes may be used to determine the angle between the first portion and the second portion. In the case that ends of the portions 206A, 206C are used to determine the angle, the end may be a terminal end of the portion, which may be any suitable point marking an end of the portion, including an end of a straight portion.

As illustrated in FIG. 2, in some embodiments, the portion 206C may be angled with respect to the portion 206A such that an end of the contact 206 that protrudes into the concave portion 212 is brought closer to an exterior of the housing 208 and farther from a center of the module 200. The portion 206C may be angled toward an open side of the concave portion 212. Thus, in some embodiments, the portion 206C may be angled away from the center axis 214 of the module 200. The center axis 214 may be an axis of the module 200 along a length direction of the module 200 from a top surface of the module 200 to a bottom surface of the module 200, where the bottom surface of the housing 208 is the surface that is to be adjacent to or contacting the substrate 202 when the module 200 is affixed to the substrate 202. When the portion 206C is angled away from the center axis 214 of the module 200 with respect to the portion 206A, an end of the portion 206C that is contiguous with portion 206B may have a perpendicular distance to the center axis 214 that is less than the perpendicular distance between the center axis 214 and a distal end of the portion 206C. Additionally, the distal end of the portion 206C may have a perpendicular distance to the center axis that is larger than a perpendicular distance between the center axis 214 and an end of the portion 206A that is disposed outside the housing 208 and/or an end of the portion 206A that is disposed inside of the housing 208.

As illustrated in FIG. 1, the contact 206 may be arranged in the module 200 such that the contact 206 does not contact the contact pad 204 when the module 200 is disposed on the substrate 202. Rather, there is some distance 210 between the contact 206 and the contact pad 204. The distance 210 may be a distance between an axis of the portion 206C and the contact pad 204 or between an end of the contact 206 and the contact pad 204, or any other suitable measure of distance between the contact 206 and the pad 204. The distance 210 from the contact 206 to the contact pad 204 may be larger than a distance between the contact 206 to the surface 208A of the housing 208. The distance 210 may be equal to or larger than a distance between the contact 206 and a plane of the bottom surface of the housing 208, where the bottom surface of the housing 208 is the surface that is to be adjacent to or contacting the substrate 202 when the module 200 is affixed to the substrate 202. In some embodiments, the distance between the portion 206C and the surface 208A may be smaller than a distance between the portion 206C and the plane of the bottom surface of the housing 208.

The distance 210 may be any suitable distance, as embodiments are not limited in this respect. As discussed below, a deposition process may be used to deposit a conductive material to electrically connect the contact 206 to the contact pad 204. In some embodiments, the deposition process may have a minimum dimension, where the minimum dimension relates to a size and shape of the smallest unit of conductive material that can be deposited with the deposition process. The minimum dimension may relate, for example, to a diameter of the smallest unit of conductive material (where the diameter of the unit may be considered to be a height, width, length, or other measure of a shape, including shapes other than circles or cylinders). In some such embodiments, the distance 210 may be larger than the minimum dimension of the deposition process that is to be used for depositing conductive material.

Embodiments are not limited to operating with any particular type or types of contacts 206 or contact pads 204. In some embodiments, the contact 206 may be a contact pin that includes nickel-plated or gold-plated copper, or includes any other suitable materials. The contact pad 204 may include any suitable materials for a contact pad, including materials that are used for contact pads of printed circuit boards or other substrates. The contact pad 204 may include, for example, one or more metals. The substrate 202 may be any suitable surface to which a circuit or module may be affixed and that includes a contact pad 204. In some embodiments, the substrate 202 may be a printed circuit board or other surface to which electrical components may be affixed. The substrate 202 may include one or more electrical components, including electrical components that may exchange (including transmitting and/or receiving) electrical signals via the contact pad 204 and, following deposition of a conductive material electrically connecting the contact pad 204 to the contact 206, the contact 206.

As discussed above, the module 200 may be any suitable module and may include any suitable electrical components. The contact 206 may therefore be connected to any suitable electrical components, as embodiments are not limited in this respect. In some embodiments, the module 200 may be a camera module that includes one or more components of a camera, such as a camera for a mobile device like a mobile phone. In some embodiments, the camera module may include one or more lenses for the camera and/or one or more actuators for moving the lenses. The camera module may also, in some embodiments, include an image sensor. In some embodiments in which the module 200 is a camera module, the contact 206 may be a contact for conveying signals regarding focus operations for the camera. More particularly, in some embodiments, the contact 206 (and, in some cases, a second contact) may communicate, to and/or from an actuator that moves lens(es), signals instructing the actuator on how to move the lens(es) and/or indicating how the actuator has moved the lens(es). The signals communicated by the contact 206 may, in some embodiments, be power signals that provide power to the actuator for moving the lens(es) and an amount of power provided to the actuator by the signals may regulate an electromotive force applied by the actuator to move the lens(es). The signals communicated to/from the actuator by the contact 206 may be communicated to/from a control circuit for the camera module, which may be disposed on the substrate 202. The control circuit may be carrying out a focus operation for the camera, which may be a manual, user-controlled focus operation or an autofocus operation that is not directly controlled by a user. Examples of camera modules are discussed in greater detail below. It should be appreciated, however, that embodiments are not limited to operating with camera modules or any other types of modules.

It should be appreciated that, while FIG. 2 illustrates only one contact 206, in some embodiments the module 200 may include any suitable number of contacts, including two or more contacts. In embodiments that include two or more contacts, some or all of the contacts may have angled portions. In some cases, a second contact of the module 200 may be a duplicate of the contact 206. The second contact may therefore be arranged similarly to the contact 206 and may have portions that are angled in the same manner as the portions of the contact 206. Thus, in these cases, the second contact may have portions similar to the portions 206A, 206B, 206C of the contact 206, and the portions of the second contact may have the same angles with respect to one another as the portions of the contact 206. Though, in other embodiments, a second contact that includes an angled portion may include portions that are angled with respect to one another with different angles than the angles of the contact 206, as embodiments are not limited in this respect.

In some embodiments, as in the embodiment illustrated in FIG. 2, the contact 206 may protrude into a cavity formed by a concave portion, such that the contact 206 is surrounded by empty space prior to deposition of a conductive material. In some such embodiments, an end of the contact 206 may be separated from the housing 208 by some distance, as the end of the contact 206 is shown in FIG. 2 to be separated from the surface 208A by a distance.

Embodiments are not limited to including an angled portion that protrudes into a cavity and that is surrounded by empty space prior to deposition of a conductive material. Rather, in some embodiments, a contact may include an angled portion that is disposed outside of the housing and that contacts a surface of the housing. Examples such embodiments are illustrated in FIGS. 3 and 4.

FIG. 3 illustrates a module 300 that is disposed on a substrate 302. The substrate 302 includes a contact pad 304 and the module 300 includes a contact 306 that is to be electrically connected to the contact pad 204. As with the contact 206 of FIG. 2, the contact 306 includes a portion 306A that is at least partially disposed within the housing 308 and portion 306C that is disposed outside of the housing 308. The portion 306C is angled with respect to the first portion 306A. As should be appreciated from the foregoing, while the example of FIG. 3 illustrates the portion 306C at a 90-degree angle to the portion 306A and parallel to the contact pad 304, embodiments are not limited to a contact 306 having portions at any particular angles with respect to one another or to contact pads.

As illustrated in FIG. 3, while the portion 306C is disposed outside of the housing 308, the portion 306C extends along the surface 308A of the housing 308 and contacts the surface 308A. The portion 306C is illustrated contacting the surface 308A for nearly an entirety of the portion 306C, though embodiments are not limited to any particular amount of contact between the contact 306 and the surface 308A. In some embodiments, a majority of the part of the contact 306 that is disposed outside of the housing 308 may contact the surface 308A of the housing 308. In some embodiments, a part of the contact 306 that is disposed outside of the housing 308 may include a portion that extends straight along an axis for a distance, and a part of or a majority of this straight portion may contact the surface 308A of the housing 308.

In embodiments in which a portion of the contact 306 extends along and contacts a surface of the housing 308, the portion may contact any suitable surface of the housing 308. In the example of FIG. 3, the housing 308 includes a concave portion 312 that forms a cavity and the portion 306C contacts a surface 308A that forms one of the surfaces of the concave portion 312. In other embodiments, the contact 306 may extend along any suitable surface.

Further, it should be appreciated that, in embodiments in which a portion of the contact 306 extends along and contacts a surface 308A of the housing 308, the surface 308A may be disposed at any suitable angle relative to the portion of the contact 306 that is disposed inside of the housing 308. In the example of FIG. 3, both the surface 308A and the portion 306C are at a 90-degree angle with respect to the first portion 306A of the contact 306. It should be appreciated, however, that the surface 308A (or any other surface along which the contact 306 extends) may be disposed at any suitable angle between 0 degrees and 180 degrees relative to the first portion 306A. For example, in some other embodiments, the surface 308A may be disposed at an angle greater than 45 degrees, greater than 75 degrees, or greater than 85 degrees relative to the first portion 306A, and may be disposed at an angle less than 95 degrees, less than 105 degrees, or less than 135 degrees. The portion 306C that contacts the surface 308A may be at the same angle to the portion 306A as the surface 308A.

As with the example of FIG. 2, in the embodiment illustrated in FIG. 3 an end of the contact 306 may be separated from the contact pad 304 by a distance 310. The distance 310 may be, in some embodiments, a distance that is greater than a minimum dimension of a deposition process that is to be used to deposit a conductive material, as discussed above in connection with FIG. 2.

FIG. 4 illustrates a module 400 that is disposed on a substrate 402. The substrate 402 includes a contact pad 404 and the module 400 includes a contact 406 that is to be electrically connected to the contact pad 404. As with the contact 206 of FIG. 2, the contact 406 includes a portion 406A that is at least partially disposed within the housing 408 and portion 406C that is disposed outside of the housing 408. The portion 406C is angled with respect to the first portion 406A. As should be appreciated from the foregoing, while the example of FIG. 4 illustrates the portion 406C at a 90-degree angle to the portion 406A and parallel to the contact pad 404, embodiments are not limited to a contact 406 having portions at any particular angles with respect to one another or to contact pads.

As illustrated in FIG. 4, while the portion 406C is disposed outside of the housing 408, the portion 406C extends along the surface 408A of the housing 408 and contacts the surface 408A. The portion 406C is illustrated contacting the surface 408A for nearly an entirety of the portion 406C, though embodiments are not limited to any particular amount of contact between the contact 406 and the surface 408A. In some embodiments, a majority of the part of the contact 406 that is disposed outside of the housing 408 may contact the surface 408A of the housing 408. In some embodiments, a part of the contact 406 that is disposed outside of the housing 408 may include a portion that extends straight along an axis for a distance, and a part of or a majority of this straight portion may contact the surface 408A of the housing 408.

In embodiments in which a portion of the contact 406 extends along and contacts a surface of the housing 408, the portion may contact any suitable surface of the housing 408. In the example of FIG. 4, the housing 408 includes a concave portion 412 that forms a cavity and the portion 406C contacts a surface 408A that forms one of the surfaces of the concave portion 412. In other embodiments, the contact 406 may extend along any suitable surface.

Further, it should be appreciated that, in embodiments in which a portion of the contact 406 extends along and contacts a surface 408A of the housing 408, the surface 408A may be disposed at any suitable angle relative to the portion of the contact 406 that is disposed inside of the housing 408. In the example of FIG. 4, both the surface 408A and the portion 406C are at a 90-degree angle with respect to the first portion 406A of the contact 406. It should be appreciated, however, that the surface 408A (or any other surface along which the contact 406 extends) may be disposed at any suitable angle between 0 degrees and 180 degrees relative to the first portion 406A. For example, in some other embodiments, the surface 408A may be disposed at an angle greater than 45 degrees, greater than 75 degrees, or greater than 85 degrees relative to the first portion 406A, and may be disposed at an angle less than 95 degrees, less than 105 degrees, or less than 135 degrees. The portion 406C that contacts the surface 408A may be at the same angle to the portion 406A as the surface 408A.

In the examples of FIGS. 2 and 3, a second portion of a contact was angled with respect to a first portion such that a second portion angled away from a center axis of a module. Embodiments are not limited to including contacts having portions that angle away from a center axis of a module. In the embodiment of FIG. 4, the portion 406C is angled with respect to the portion 406A such that an end of the As illustrated in FIG. 4, in some embodiments, the portion 406C may be angled with respect to the portion 406A such that an end of the contact 406 that is disposed outside the housing 408 is brought closer to an interior of the housing 408 and closer to a center of the module 400. The portion 406C may be angled away from an open side of the concave portion 412. Thus, in some embodiments, the portion 406C may be angled toward a center axis of the module 400. When the portion 406C is angled away from a center axis of the module 400 with respect to the portion 406A, an end of the portion 406A that is disposed inside the housing 408 and is contiguous with a portion of the contact 406 disposed outside of the housing 408 may have a perpendicular distance to the center axis of the module 400 that is larger than the perpendicular distance between the center axis and a distal end of the portion 406C.

As with the example of FIG. 2, in the embodiment illustrated in FIG. 4 an end of the contact 406 may be separated from the contact pad 404 by a distance 410. The distance 410 may be, in some embodiments, a distance that is greater than a minimum dimension of a deposition process that is to be used to deposit a conductive material, as discussed above in connection with FIG. 2.

Figure 5A:
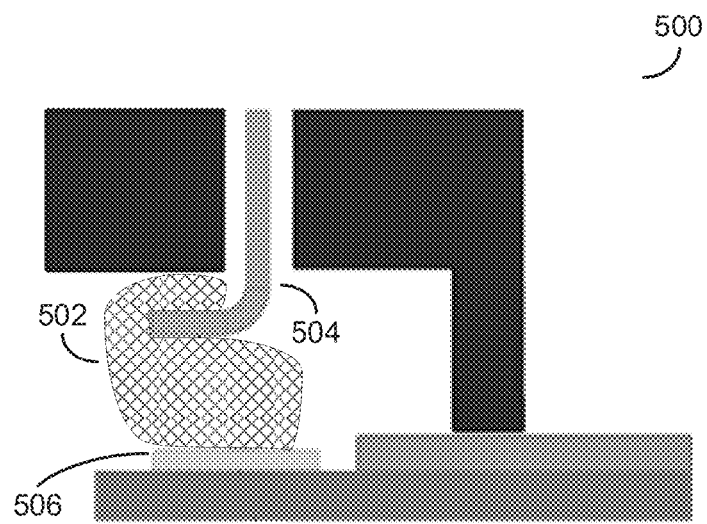
FIGS. 5A and 5B are examples of ways in which conductive material may be deposited to electrically connect contacts to contact pads in some embodiments.
Figure 5B:
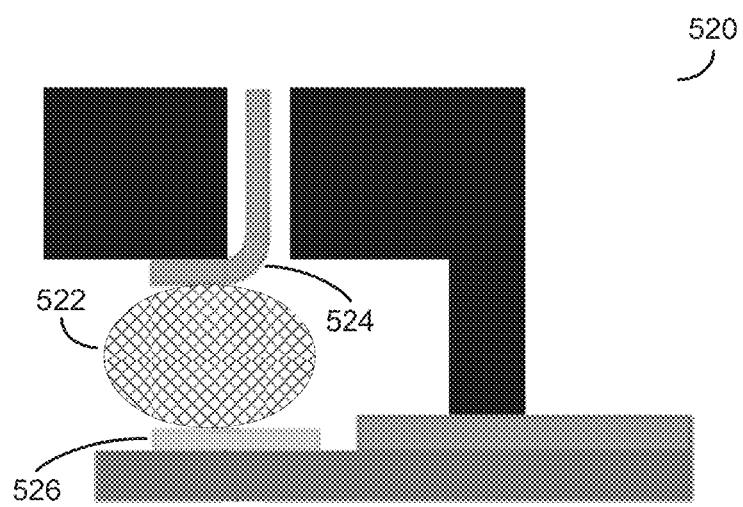

A conductive material may be deposited in any suitable manner to electrically connect a contact to a contact pad. FIGS. 5A and 5B illustrate examples of ways in which a conductive material may be deposited. The examples of FIGS. 5A and 5B illustrate examples of contacts that correspond to the examples of FIGS. 2 and 3.

FIG. 5A illustrates an apparatus 500 that includes a module affixed to a substrate, where the module includes a contact 504 and the substrate includes a contact pad 506. The contact 504 protrudes from a housing of the module into a cavity such that, before deposition of conductive material 502, an end of the contact 504 was surrounded by empty space. The contact 504 is illustrated in FIG. 5A as electrically connected to the contact pad 506 by a conductive material 502. The conductive material may be any suitable material for electrically connecting the contact 504 to a contact pad 506 such that electrical signals may be conveyed between the contact 504 and pad 506. In some embodiments, the conductive material 502 may also be a material that holds the contact 504 in place and limits or prevents movement of the contact 504. Examples of conductive material that may be used include solder and conductive adhesives.

As illustrated in FIG. 5A, in some embodiments the conductive material 502 may contact the contact 504 on more than one side of the contact 504. For example, in embodiments in which the contact 504 protrudes into a cavity and, before deposition of the conductive material, is surrounded by empty space of the cavity, when the conductive material 502 is deposited the conductive material 502 may contact the contact 504 on two or more sides of the contact 504. In some embodiments, the conductive material 502 may surround at least a part of the contact 504 that is disposed outside the housing of the module. FIG. 5A shows a cross-section of the apparatus 500, though those of skill in the art will understand that the material 502 may surround the contact 500. Contacting the contact 504 with the conductive material 502 on more than one side may be advantageous in some embodiments, as the contact 504 may be less likely to disconnect from the conductive material 502 (due to rough handling or dropping, or for any other reason) than if the conductive material 502 contacted the contact 502 on only one side.

As discussed above in connection with FIGS. 2 and 3, an end of the contact 504 may be separated from the contact pad 506 by a distance greater than a minimum dimension of a deposition process that is used to deposit the conductive material. Accordingly, the amount of conductive material 502 in the apparatus 500 is more than the minimum amount that may be deposited using the deposition process.

FIG. 5B illustrates a second example of an apparatus 522 in which a conductive material 522 electrically connects a contact 524 to a contact pad 526. In the example of FIG. 5B, the contact 524 extends along and contacts a surface of a housing of the apparatus 522. The contact 524 therefore has one side that is against the housing and on which the conductive material 522 cannot contact the contact 524. The conductive material 522 may therefore, in some embodiments, contact the contact 524 on only one side, as is illustrated in FIG. 5B. In other embodiments, however, the conductive material 522 may contact the contact 524 on more than one side, such as the left-hand side of the end of the contact 524 in the orientation of FIG. 5B, or on other sides of the contact 524 not illustrated in the cross-section of FIG. 5B.

As discussed above in connection with FIGS. 2 and 3, an end of the contact 524 may be separated from the contact pad 526 by a distance greater than a minimum dimension of a deposition process that is used to deposit the conductive material. Accordingly, the amount of conductive material 522 in the apparatus 520 is more than the minimum amount that may be deposited using the deposition process.

In the examples of FIGS. 5A and 5B, an amount of conductive material that is sufficient to make electrical contact between a contact pad and a contact and/or to hold the contact in place is deposited. In embodiments in which part of the contact is disposed outside the housing in a concave portion of the housing, the conductive material may be deposited in the concave portion and may fill less than half a volume of the concave portion. In other embodiments, however, more conductive material may be deposited. For example, in some embodiments, an amount of conductive material may be deposited such that a majority of a volume of the concave portion may be filled with the conductive material. In other embodiments, an entirety of a volume of a concave portion not occupied by the contact may be filled with the conductive material. Depositing more conductive material may aid in ensuring that the contact remains in contact with the conductive material and in electrical contact with the contact pad despite rough handling or dropping.

As discussed above, in some embodiments a module that includes a contact having an angled portion may be a camera module. Examples of camera modules that may be implemented with contacts having angled portions in some embodiments are discussed below in connection with FIG. 6-8. It should be appreciated, however, that embodiments are not limited to operating with camera modules or any particular type of camera module that includes any particular component(s).

FIG. 6 illustrates a device comprising a camera module 600 and that is adapted to automatically focus the camera of the camera module 600. As discussed in greater detail below in connection with FIG. 8, the camera block 600 includes an optical chip and an optical block. The optical block of the camera module 600 includes at least one lens and an actuator for moving the lens(es). The actuator may be any suitable mechanism for moving the lens(es), as embodiments are not limited in this respect. An example of an actuator is discussed below in connection with FIG. 7. The actuator may be controlled to move the lens(es) of the camera module 600 to adjust a focus of an image viewed by an image sensor of the camera module 600. The optical chip of the camera module 600 includes at least an image sensor.

Camera module 600 is affixed to a printed circuit board 606. A control circuit 604 is also affixed to the printed circuit board 606 and is adapted to manage the camera module 600. The control circuit 604 may be any suitable control circuit, including a programmed processor, as embodiments are not limited in this respect.

The camera module 600 comprises an integrated circuit chip called an optical chip on which an image sensor and a Micro-Electromechanical System (MEMS) 602 for focusing the camera module 600, not shown in FIG. 6, are mounted. The MEMS 602 comprises the one or more lenses and actuator used to focus the lens(es). The image sensor of the module 600 senses images through the lens(es) and sends image signals to the control circuit 604 through one or more connections external to the camera module 600. These connections may be implemented in any suitable manner, including as contacts having angled portions as described herein. Using a focusing operation, the control circuit 604 generates focus control signals and transmits them to the MEMS 602 via one, two, or more contacts. The focusing operation of the control circuit 604 may be any suitable focusing operation, including a manual focusing operation in which the signals are generated based on user input or an automatic focusing operation (e.g., an autofocus operation) in which the signals are generated from a processing of the image signals received by the circuit 604 from the image sensor. In accordance with techniques described herein, the control circuit 604 may communicate the focus control signals to the MEMS 602 via contacts having angled portions. The focus control signals that are generated by the circuit 604 and sent to the MEMS 602 may be any suitable control signal, including a power signal that powers the actuator of the MEMS 602 in a particular manner so as to cause the actuator to move the lens(es) in a particular manner. The contacts over which the image signals and/or the focusing control signals are sent may be electrically connected to contact pads on the board 606 with a conductive material.

Figure 7:
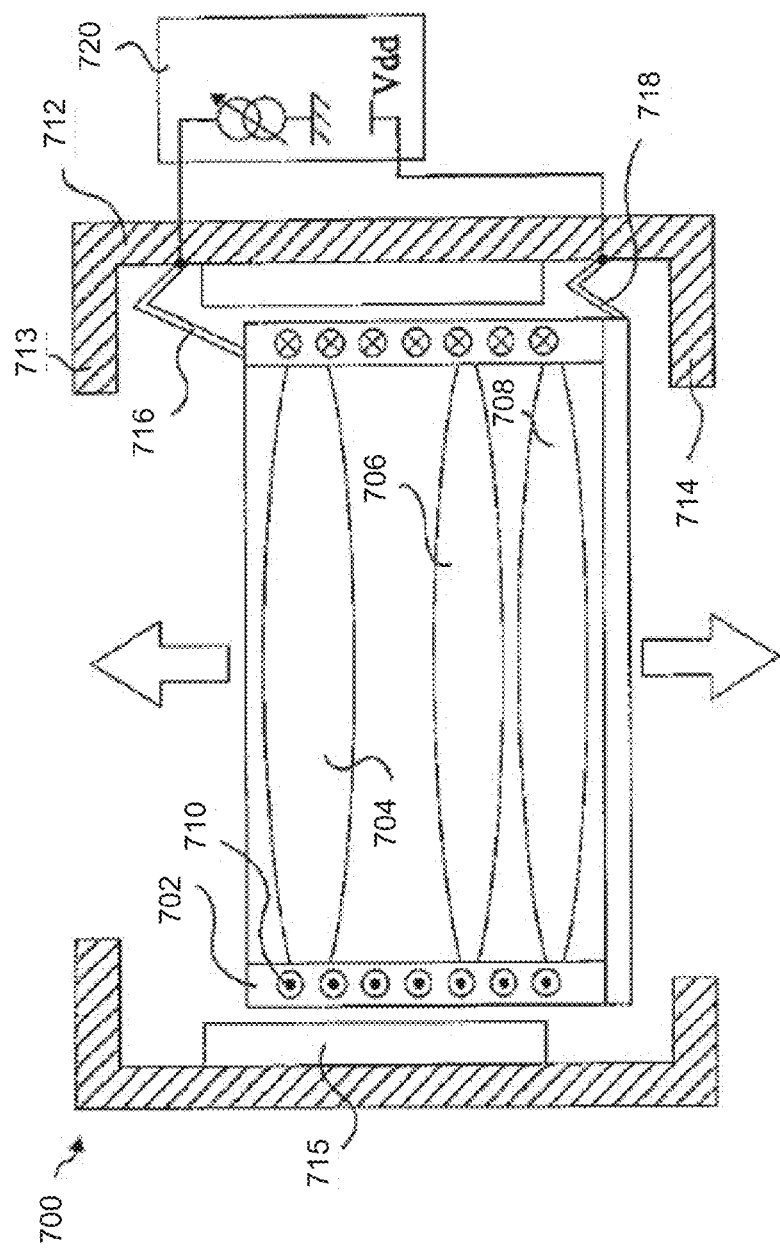
FIG. 7 is an illustration of some components of a camera module with which some embodiments may operate.

FIG. 7 illustrates schematically in cross-section a portion of a camera module 700 comprising a cylindrical lens barrel 702 with a number of fixed lenses 704, 706 and 708 mounted therein. The lens barrel 702 has a conducting coil 710 mounted within its walls. The coil 710 is formed of a wire represented in cross-section by small circles with dots to represent a current flow one way in the wire, and crosses to represent a current flow in the opposite direction. Camera module 700 also comprises a housing 712, which is for example formed of plastic, and has rims 713, 714 at the top and bottom respectively, which extend some way towards the center of the housing, and act as stoppers for the lens barrel 702. A permanent magnet 715, which is for example also cylindrical, is mounted against the inner surface of the housing 712 and lies adjacent to the lens barrel 702. The coil 710, and the permanent magnet 715 together form a voice coil motor (VCM). Springs 716 and 718 are connected between the housing 712 and the lens barrel 702. The coil 710, magnet 715, and springs 716, 718 form an actuator for moving the lens barrel 702. The actuator may move the lens barrel 702 for any reason, including to focus the image seen by an image sensor of the camera of the camera module 702.

Coil 710 is connected to a current source, in this example via conductive springs 716 and 718. In particular, springs 716 and 718 connect opposite ends of coil to a control circuit 720 (e.g., control circuit 604 of FIG. 6), which comprises a variable current source coupled between spring 716 and ground, and a supply voltage Vdd connected to spring 718. In operation, the camera module 700 is mounted over an image sensor (not shown in FIG. 7), and the positioning of the lenses with respect to the image sensor can be adjusted by moving the lens barrel 702 up and down within the housing. Moving the lens barrel 702 can be achieved by passing a current signal through the coil 710. Springs 716, 718 hold the lens barrel 702 at an first position at the bottom end of the housing resting against rim 713 when no current is applied to the coil. When current is applied to the coil, due to electromagnetic force generated by the current flow in a magnetic field, the lens barrel moves towards the top of the housing, counteracting the force of the springs 716, 718. Springs 716, 718 have an increasing restoring force the further the lens barrel 702 is from its first position, meaning that the lens barrel 720 rests at in equilibrium at a certain position depending on the current level applied to the coil.

Figure 8:
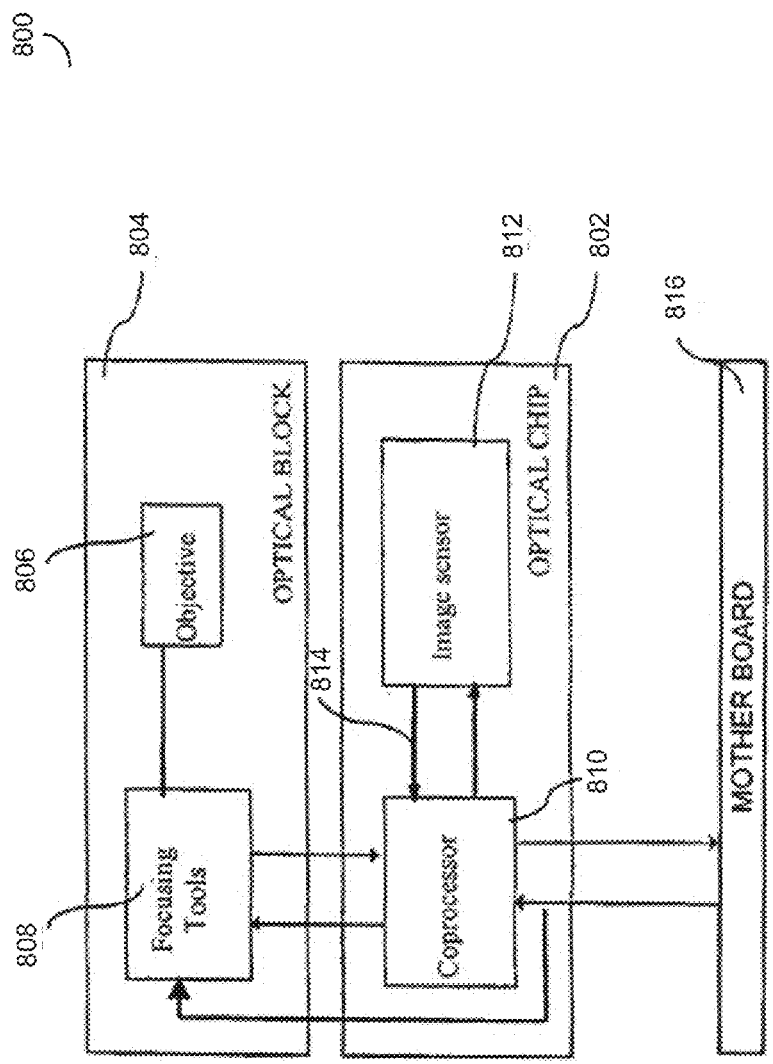
FIG. 8 is another illustration of some components of a camera module with which some embodiments may operate.

FIG. 8 is another diagram of an example of a camera module 800 with which some embodiments may operate. As illustrated in FIG. 8, the camera module 800 is connected to a substrate, labelled in FIG. 8 as the motherboard 816. The camera module 800 includes two main parts: an optical block 804 and an integrated circuit chip called an optical chip 802. The optical block 804 comprises an objective 806 composed of a set of one or more lenses that are at least partly mobile, and focusing means 808. Focusing tools 808 may include any suitable actuator, for example including a motor and gears, to adjust the position of the lens(es) of the objective 806. The optical chip 802 comprises an image sensor 812 and a coprocessor 810.

The image sensor 812 sends image signals to the processor 810 through a connection 814. The coprocessor 810 processes these image signals in advance, and may send processed image signals to the mother board 816. The coprocessor 810 may also generate a control signal for the focusing tools 808 to control the focusing tools 808 to move the lens (es) of the objective 806 to focus the image received by the image sensor 812. The coprocessor 810 may generate the control signal from the focusing tools 808 in any suitable manner, as embodiments are not limited in this respect. In some embodiments, the coprocessor 810 may generate the control signals based on processing image signals received from the image sensor 812 via the connection 814, such as by processing the image signals in an autofocusing operation that the coprocessor 810 is programmed to perform. The optical chip 802 and the focusing tools 808 may receive electrical power output from the mother board 816.

Image signals, control signals, and electrical power are transferred between the optical block 804, the optical chip 802, and the mother board 816 through contacts of the camera module. In accordance with techniques described herein, at least some of these contacts may be contacts that include an angled portion. For example, the optical block 804 may include two contacts that communicate control signals from the coprocessor 810 to the focusing tools 808 for focusing the lens(es) of the objective 806.

Figure 9:
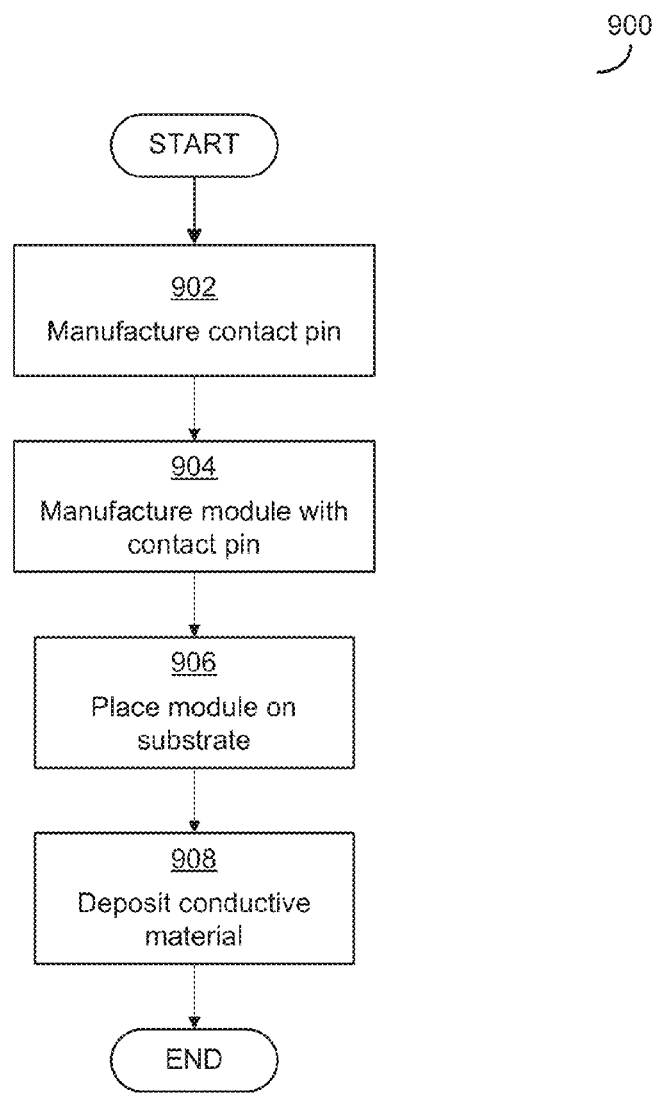
FIG. 9 is a flowchart of a process that may be used in some embodiments for manufacturing a module having a contact in accordance with techniques described herein.

FIG. 9 illustrates a method that may be used in some embodiments for manufacturing an apparatus that includes a contact having an angled portion. It should be appreciated that embodiments are not limited to implementing the technique illustrated in FIG. 9 and that other embodiments are possible.

The process 900 of FIG. 9 begins in block 902, in which a manufacturer manufactures a contact pin. The contact pin may be manufactured in any suitable manner, as embodiments are not limited in this respect. In some embodiments, the contact pin may be manufactured using a process for extruding copper and plating the extruded copper with nickel or gold.

In block 904, a manufacturer (who may be the same or a different manufacturer than the manufacturer of block 902) manufactures a module. The manufacturer may manufacture the module in any suitable manner, including any suitable technique for arranging one or more components, including electrical components, camera components, or other suitable components, within a housing. As part of manufacturing the module in block 904, the manufacturer may affix the contact pin to the module such that a portion of the contact pin is disposed within the housing and a portion of the contact pin is disposed outside of the housing of the module. The contact pin may, in some embodiments, be arranged in a concave portion of the housing, where the concave portion includes a top surface. In some such embodiments, the contact pin may be arranged such that a distance between an end of the contact pin and the top surface is smaller than a distance between the end of the contact pin and a plane of a bottom surface of the module. In some such embodiments, the end of the contact pin may be flush with the top surface of the concave portion.

In either or both of blocks 902 and 904, the contact pin may be bent or an angled portion otherwise formed by a manufacturer such that the contact pin includes one portion that is angled with respect to another portion of the contact pin. In some embodiments, the contact pin may be bent in block 902 such that the contact pin has the angled portion before the contact pin is combined with other components in the module in block 904. In other embodiments, the contact pin may be manufactured in block 902 as a straight pin and, as part of assembling the module in block 904, a manufacturer may form the contact pin into a desired shape with an angled portion. Embodiments are not limited to shaping the contact pin at any particular time or in any particular manner.

In blocks 906, 908 the module is affixed to a substrate. As discussed above, the substrate may be any suitable substrate and may have arranged thereon one or more electrical components. In block 906, the module is placed on the substrate such that a bottom surface of the module contacts the substrate. In some embodiments, when the module is placed on the substrate, the module may be secured to the substrate at one or more points, which may be other contacts of the module (which contacts may or may not include angled portions) or other points for securing the module to the substrate. In block 908, a conductive material is deposited that electrically connects the contact pin to a contact pad of the module. The conductive material may be deposited such that the conductive material contacts one, two, or more sides of the contact pin, or surrounds at least part of the contact pin. In embodiments in which a part of the contact pin is disposed in a concave portion of a housing of the module, the conductive material may be deposited in block 908 such that the conductive material fills more than half a volume of the concave portion, or such that the conductive material fills an entirety of the volume of the concave portion that is not occupied by the contact pin.

Once the conductive material is deposited and the contact pin is electrically connected to the contact pad of the substrate, the process 900 ends.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. An apparatus comprising:
   a camera module, the camera module comprising:
      a housing;
      an image sensor disposed within the housing;
      at least one lens disposed within the housing;
      an actuator to move the at least one lens in accordance with a signal received via a control input of the actuator, the actuator being disposed within the housing; and
      a contact comprising a first portion disposed within the housing and a second portion disposed outside of the housing, the second portion being angled with respect to the first portion, the contact being electrically connected to the control input;
   a substrate coupled to the housing and forming a cavity between the housing and the substrate, the substrate comprising:
      a contact pad, the first portion of the contact extending toward the contact pad, the second portion being disposed in the cavity and spaced apart from the contact pad;
      a control circuit to perform a focus operation to produce the signal and to output the signal via an output, the output being electrically connected to the contact pad; and
      a conductive material deposited in the cavity and contacting the second portion of the contact and the contact pad.

2. The apparatus of claim 1, wherein the contact further comprises a third portion disposed in the cavity between the first portion and the second portion.

3. The apparatus of claim 1, wherein:
   the housing comprises a first surface; and
   the second portion extends along the first surface and contacts the first surface.

4. The apparatus of claim 1, wherein:
   the second portion of the contact comprises two or more sides; and
   the conductive material contacts the second portion of the contact on at least two of the two or more sides.

5. The apparatus of claim 4, wherein the conductive material surrounds at least part of the second portion of the contact.

6. The apparatus of claim 4, wherein:
   the conductive material fills more than half of a volume of the cavity.

7. The apparatus of claim 1, wherein:
   the camera module further comprises a second contact, the second contact comprising a third portion disposed within the housing and a fourth portion disposed outside of the housing, the fourth portion being angled with respect to the third portion,
   wherein the second portion is angled with respect to the first portion at a same angle that the fourth portion is angled with respect to the third portion.

8. The apparatus of claim 1, wherein the second portion is angled with respect to the first portion at least 75 degrees.

9. The apparatus of claim 1, wherein:
   the second portion comprises a first end and a second end, the first end being closer to the first portion than the second end; and
   the second portion is angled with respect to the first portion away from a center axis such that a perpendicular distance between the center axis and the second end is larger than a perpendicular distance between the center axis and the first end.

10. The apparatus of claim 1, wherein:
    the second portion comprises a first end and a second end, the first end being closer to the first portion than the second end; and
    the second portion is angled with respect to the first portion toward a center such that a perpendicular distance between the center axis and the second end is smaller than a perpendicular distance between the center axis and the first end.

11. The apparatus of claim 1, wherein the contact comprises copper plated with nickel.

12. The apparatus of claim 1, wherein the contact comprises copper plated with gold.

13. The apparatus of claim 1, wherein the conductive material comprises solder.

14. The apparatus of claim 1, wherein the conductive material comprises a conductive adhesive.

15. The apparatus of claim 1 wherein the second portion is angled to extend substantially parallel to the contact pad.

16. An apparatus comprising:
    a housing having a vertical axis;
    an actuator to move at least one lens along the vertical axis, the actuator being disposed within the housing; and
    a contact pin comprising a first portion and a second portion, the first portion disposed within the housing and having a longitudinal axis parallel to the vertical axis of the housing, the second portion disposed outside of the housing and angled with respect to the first portion and having a bottom surface that is configured to receive a conductive material to couple the second portion to a contact pad of a substrate.

17. The apparatus of claim 16, wherein the second portion is angled, with respect to the first portion, away from an interior of the housing.

18. The apparatus of claim 16, wherein the second portion is angled, with respect to the first portion, away from a center of the housing.

19. The apparatus of claim 16, wherein:
    the housing comprises a concave portion formed on an exterior of the housing, the concave portion comprising an open side;
    the second portion of the contact that is disposed outside of the housing is disposed in the concave portion; and the second portion is angled, with respect to the first portion, toward the open side of the concave portion.

20. The apparatus of claim 16, wherein the second portion is angled, with respect to the first portion, toward a center of the housing.

21. The apparatus of claim 16, wherein the contact pin further comprises a third portion disposed outside of the housing between the first portion and the second portion.

22. The apparatus of claim 16, wherein:
the housing comprises a first surface; and
the second portion extends along the first surface and contacts the first surface.

23. The apparatus of claim 16, wherein:
the actuator comprises a control input to receive a signal indicating how the actuator is to move the at least one lens;
the contact pin is electrically connected to the control input.

24. The apparatus of claim 23, further comprising:
a second contact pin comprising a third portion disposed within the housing and a fourth portion disposed outside of the housing, the fourth portion being angled with respect to the third portion,
wherein the actuator comprises a second control input, and
wherein the second contact pin is electrically connected to the second control input.

25. The apparatus of claim 24, wherein the second portion is angled with respect to the first portion at a same angle that the fourth portion is angled with respect to the third portion.

26. The apparatus of claim 23, further comprising:
a control circuit to perform an autofocus operation at least in part by generating the signal, the control circuit comprising an output,
wherein the contact pin is electrically connected to the output.

27. The apparatus of claim 16, further comprising:
a conductive material, disposed outside of the housing, contacting the contact pin, wherein:
the second portion of the contact pin comprises two or more sides; and
the conductive material contacts the second portion of the contact pin on at least two of the two or more sides.

28. The apparatus of claim 27, wherein the conductive material surrounds at least part of the second portion of the contact pin.

29. The apparatus of claim 16, wherein the second portion is at a 90-degree angle to the first portion.

30. The apparatus of claim 16, wherein the second portion is at an angle of at least 45 degrees with respect to the first portion.

31. The apparatus of claim 16, wherein:
the housing has a first surface;
the contact pin protrudes from the first surface; and
the second portion is parallel to the first surface.

32. The apparatus of claim 16, wherein the contact comprises copper plated with nickel.

33. The apparatus of claim 16, wherein the contact comprises copper plated with gold.

34. A method comprising:
affixing a module to a substrate, the module comprising a contact to receive focus control signals for controlling an actuator, the contact comprising a first portion disposed within the module and a second portion protruding from the module, the second portion being angled with respect to the first portion, the substrate comprising a contact pad,
wherein affixing the module to the substrate comprises depositing a conductive material in a cavity formed between the module and the substrate to electrically connect the contact to the contact pad, the conductive material contacting both the second portion of the contact and the contact pad.

35. The method of claim 34, wherein:
the module comprises a concave portion formed in an exterior of the module, the contact being disposed in the concave portion, the concave portion comprising a first surface;
when the module is affixed to the substrate, the first surface is separated from the substrate by a distance; and
depositing the conductive material comprises depositing the conductive material using a process having a minimum deposition dimension, the minimum deposition dimension being smaller than the distance.

36. The method of claim 35, wherein:
when the module is affixed to the substrate, the contact is separated from the contact pad by a second distance; and
the minimum deposition dimension is smaller than the second distance.

37. The method of claim 35, wherein depositing the conductive material comprises filling more than half a volume of the cavity with the conductive material.

38. The method of claim 34, wherein affixing the module to the substrate comprises affixing the module to the substrate such that the contact does not contact the contact pad.

39. The method of claim 34, wherein depositing the conductive material comprises surrounding at least part of the contact with the conductive material.

40. The method of claim 34, wherein:
the second portion of the contact comprises two or more sides; and
depositing the conductive material comprises depositing the conductive material such that the conductive material contacts the second portion of the contact on at least two of the two or more sides.

41. The method of claim 34, wherein:
the module comprises a concave portion formed in an exterior of the module, the contact being disposed in the concave portion, the concave portion comprising a first surface;
the second portion of the contact extends along the first surface and contacts the first surface; and
depositing the conductive material comprises depositing the conductive material between the second portion and the contact pad to electrically connect the contact to the contact pad.

42. The method of claim 34, wherein depositing the conductive material to electrically connect the contact to the contact pad comprises depositing a conductive adhesive.

43. The method of claim 34, wherein depositing the conductive material to electrically connect the contact to the contact pad comprises depositing solder.

44. The method of claim 34 wherein the second portion is angled to be substantially parallel to the contact pad.

* * * * *